(12) United States Patent
Berg

(10) Patent No.: US 7,245,560 B2
(45) Date of Patent: Jul. 17, 2007

(54) ACOUSTIC SOURCE FOR INFRASONIC ELECTROMAGNETIC WAVE EXPLORATION USING INDUCED ELECTROKINETIC EFFECT

(75) Inventor: Andrey Berg, San Diego, CA (US)

(73) Assignee: Seismoelectric Soundings, Inc., San Diego, CA (US)

( * ) Notice: Subject to any disclaimer, the term of this patent is extended or adjusted under 35 U.S.C. 154(b) by 0 days.

(21) Appl. No.: 11/283,041

(22) Filed: Nov. 18, 2005

(65) Prior Publication Data

US 2006/0153004 A1    Jul. 13, 2006

Related U.S. Application Data

(62) Division of application No. 10/865,524, filed on Jun. 9, 2004, now Pat. No. 7,042,801.

(60) Provisional application No. 60/541,643, filed on Feb. 4, 2004.

(51) Int. Cl.
*G01V 1/157* (2006.01)
(52) U.S. Cl. .................................... 367/147
(58) Field of Classification Search ................ 367/140, 367/147; 181/401, 113, 118
See application file for complete search history.

(56) References Cited

U.S. PATENT DOCUMENTS

| | | | |
|---|---|---|---|
| 3,347,336 A * | 10/1967 | Nash, Jr. | .................... 367/140 |
| 3,486,062 A * | 12/1969 | Schrom | ....................... 367/147 |
| 3,975,674 A | 8/1976 | McEuen | |
| 4,589,100 A | 5/1986 | Savit | |
| 4,693,336 A | 9/1987 | Newman | |
| 4,734,894 A * | 3/1988 | Cannelli et al. | ............ 367/147 |
| 4,764,906 A | 8/1988 | Clements et al. | |
| 4,843,597 A | 6/1989 | Gjessing et al. | |
| 4,904,942 A | 2/1990 | Thompson | |
| H001490 H | 9/1995 | Thompson et al. | |
| 5,486,764 A | 1/1996 | Thompson et al. | |
| H001561 H | 7/1996 | Thompson | |

(Continued)

OTHER PUBLICATIONS

Kepic, et al. "Field trials of a seismoelectric method for detecting massive sulfides," Geophysics, vol. 60, No. 2, (Mar. Apr. 1995).

(Continued)

*Primary Examiner*—Mark Hellner
(74) *Attorney, Agent, or Firm*—Samuel S. Lee; Procopio, Cory, Hargreaves & Savitch LLP

(57) ABSTRACT

An acoustic source for infrasonic electromagnetic wave exploration including: an electrically conductive, generally cylindrical tubular member for containing an electrically conductive fluid, the tubular member having a closed top end, an open bottom end, an interior wall and an internal diameter; an electrode axially positioned within the tubular member, wherein the electrode is axially positioned within the tubular member at a distance equivalent to about three times the internal diameter of the tubular member to enable the acoustic source to produce high energy acoustic waves having a substantial portion of acoustic wave energy in the infrasonic frequency range; means for electrically connecting the electrode to the negative electrical pole of an external source of DC electric power; and means for electrically connecting the tubular member to one of: a positive electrical pole of the external source of DC electric power; an electrical ground; and a combination of the above.

10 Claims, 13 Drawing Sheets

U.S. PATENT DOCUMENTS

| | | |
|---|---|---|
| 5,625,348 A | 4/1997 | Farnsworth et al. |
| 5,689,068 A | 11/1997 | Locatelli et al. |
| 5,841,280 A | 11/1998 | Yu et al. |
| 5,877,995 A | 3/1999 | Thompson et al. |
| 6,225,806 B1 | 5/2001 | Millar et al. |
| 6,452,395 B1 | 9/2002 | Clarke et al. |
| 6,462,549 B1 | 10/2002 | Curtis et al. |
| 6,476,608 B1 | 11/2002 | Dong |
| 6,536,553 B1 | 3/2003 | Scanlon |
| 6,597,633 B1 | 7/2003 | Millar et al. |
| 6,603,313 B1 | 8/2003 | Srnka |
| 6,628,119 B1 | 9/2003 | Eidesmo et al. |
| 6,670,813 B2 | 12/2003 | Strack |
| 6,717,411 B2 | 4/2004 | Ellingsrud et al. |
| 6,842,697 B1 | 1/2005 | Millar et al. |

OTHER PUBLICATIONS

Garambois, et al. "Full waveform numerical solutions of seismoelectromagnetic wave conversions in fluid-saturated stratified porous media," Journal of Geophysical Research, 2002.

Shaw et al. "The electro-kinetic effect: forward model and measurements." SEG Int'l Exposition and $72^{nd}$ annual meeting, Oct. 2002.

Hunt et al. "Borehole electrokinetic responses in fracture dominated hydraulically conductive zones," Geophysical Research Letters, May 2002.

"How electromagnetic sounding technique could be coming to hydrocarbon E and P," First Break, Mar. 2002.

* cited by examiner

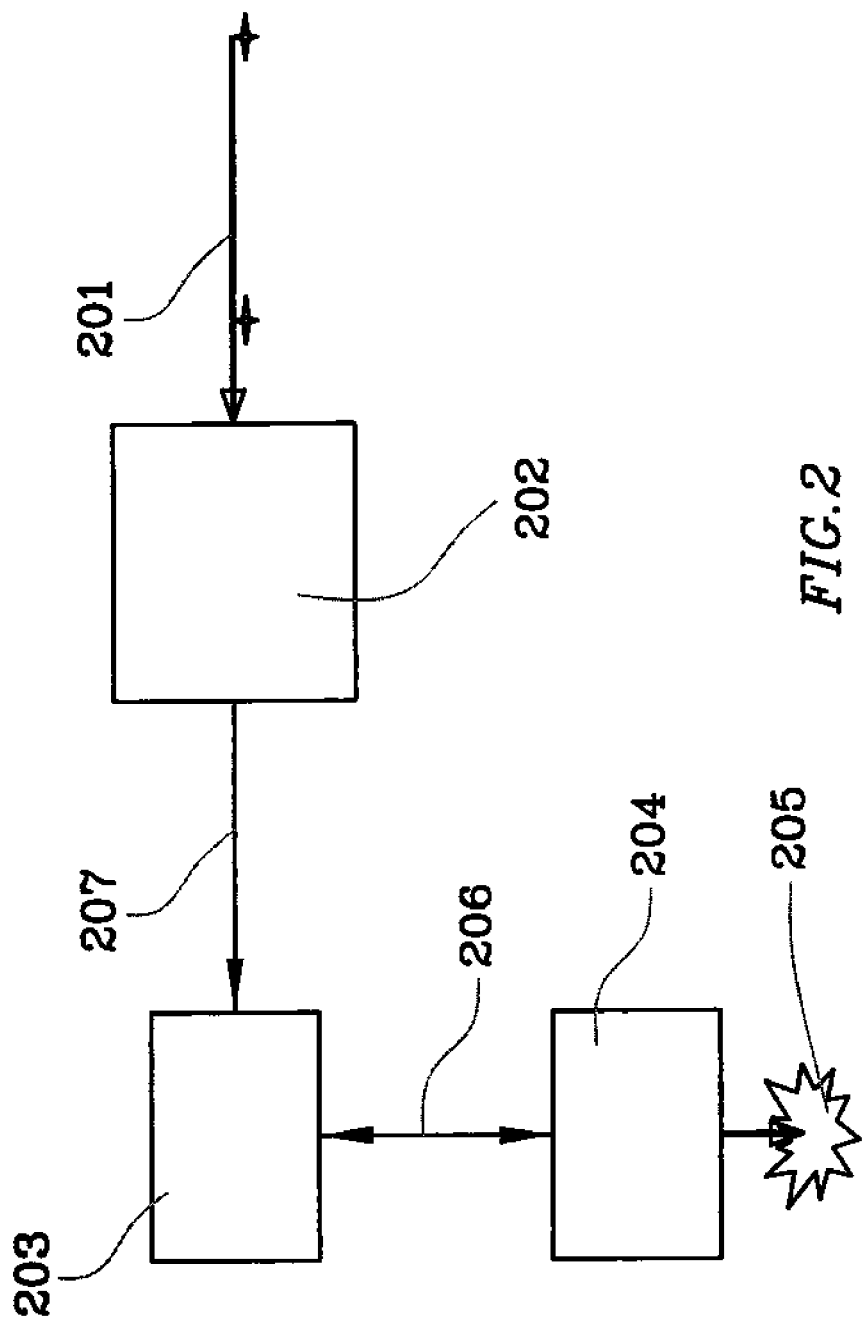

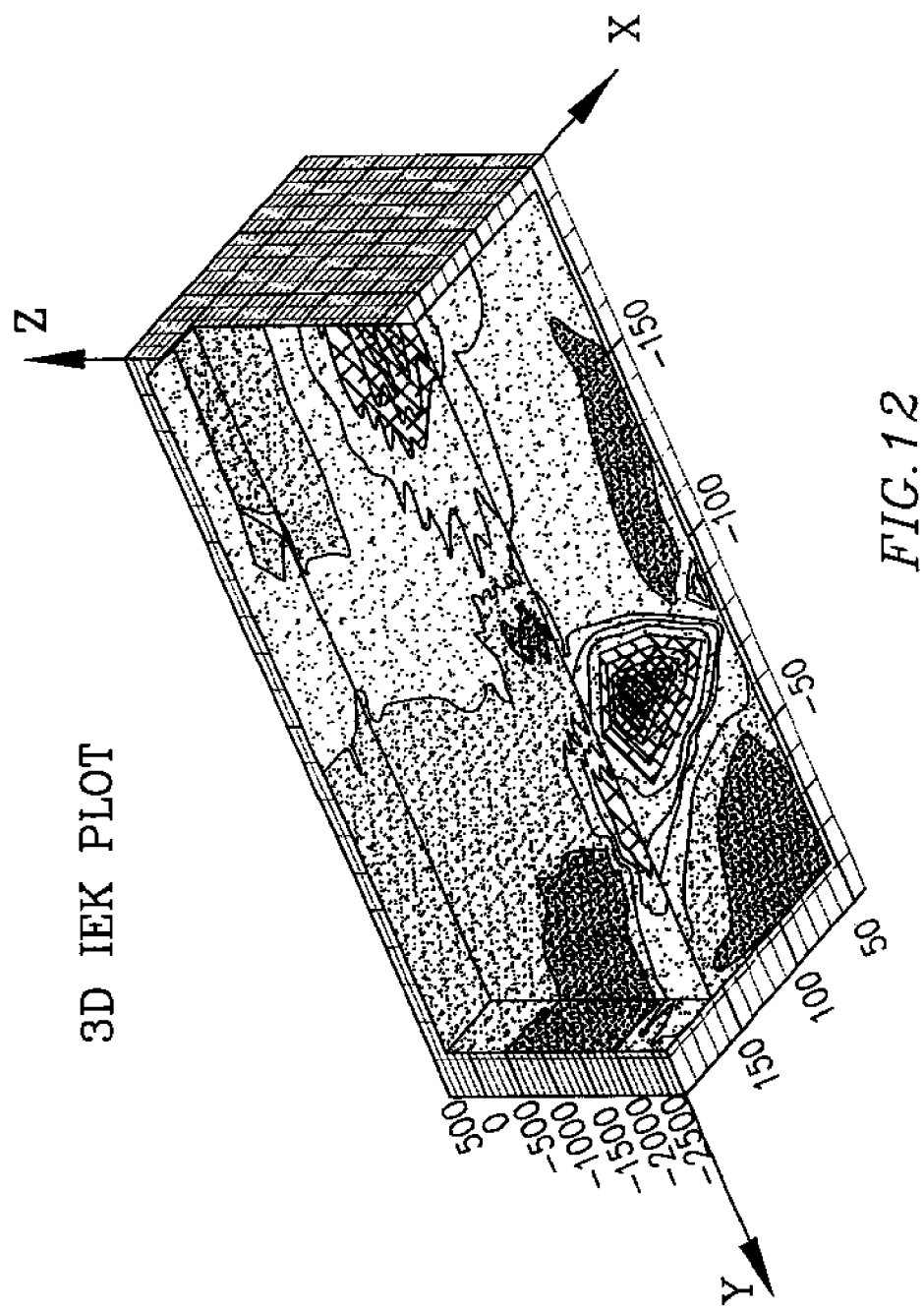

ACOUSTIC SOURCE FOR INFRASONIC ELECTROMAGNETIC WAVE EXPLORATION USING INDUCED ELECTROKINETIC EFFECT

This application is a divisional of U.S. application Ser. No. 10/865,524, filed Jun. 9, 2004 now U.S. Pat. No. 7,042,801.

APPLICATION FOR LETTERS PATENT

Claiming priority of Provisional Application 60/541643 filed Feb. 4, 2004

BACKGROUND OF THE INVENTION

1. Field of the Invention

This invention relates to the acquisition of geophysical data including that produced by induced electromagnetic effect, seismic, and coupled phenomena thereto, such as electromagnetic propagation velocity dispersion effects in lossy media.

2. Description of the Prior Art

It is a well known phenomena that electromagnetic fields impinge on the earth's surface at all times and create both electric fields and magnetic fields that are detectable utilizing proper techniques and apparatus. Such fields, for example, are generated by solar activity and ionospheric activity in the earth's own atmosphere. It has been known since the 1930's that seismic waves generated in seismic exploration techniques can generate Induced Electrokinetic (IEK) effects in the form of electromagnetic waves emanating from the earth formation structures impinged upon by the seismic waves. Prior art patents, such as U.S. Pat. No. 3,975,674 to McEuen, have taught that the electrokinetic effect radiation may be used for determining, remotely, resistivity and equivalent salinity of fluids saturating pore space in subterranean formations.

Although the McEuen patent and other more recent patents have indicated an interest in prospecting for geophysical data using induced electrokinetic (IEK) effect electromagnetic radiation, most researchers have conceded that the depth of investigation of such techniques is limited. Papers as lately as the mid 1990's have indicated that a depth of approximately 500 meters from the earth's surface was about the limit from which useful data concerning induced electrokinetic (IEK) effect electromagnetic radiation.

During the interim since the 1930's, (and the discovery of the electrokinetic effect in its first publication), seismic data processing has undergone remarkable advances. More sensitive detectors, two dimensional arrays of detectors on land, and offshore exploration by seismic streamer cable towing ships together with the advancement of computer technology have enabled seismic data to be processed and corrected for the time migration or "move out" of such data. This correction is needed to convert time line arrival data onto actual depth due to acoustic wave velocity dispersion and velocity differences in subsurface media. The earth's true acoustic velocity profile in its layers is usually unknown at the time of seismic exploration.

The present invention incorporates techniques for acquisition and processing of seismic data when necessary in order to verify or enhance induced electrokinetic electromagnetic radiation effects which are measured simultaneously therewith or in timed sequence therewith at the earth's surface. Experimental data gathered with the system of the present invention and practicing the methods thereof have successfully differentiated between dry hole prospects and producing wells in known hydrocarbon producing formations. Further these techniques have explained the discrepancies between the initial seismic survey data and the later induced electrokinetic electromagnetic radiation survey data over the same area.

Moreover, the present invention provides a means for directly detecting hydrocarbon interfaces at depth down to 5000 meters. This sharply contrasts with the previous published results as late as the mid 1990's and indicates that the invention is a significant advance in the art of geophysical prospecting.

SUMMARY OF THE INVENTION

Now, according to the present invention, I have discovered improved methods for direct prospecting for hydrocarbon bearing formations in subsurface earth strata, which methods comprise:

In a geographical area of interest:
a). applying acoustic waves, having a substantial portion of wave energy in the infrasonic frequency range, to earth strata in the geographical area of interest with sufficient acoustic energy for the acoustic waves to penetrate the earth strata at least to a depth of interest for prospecting for hydrocarbon bearing formations;
b). detecting, in seismic receivers, reflected seismic response from earth strata traversed by the applied acoustic waves;
c). detecting induced infrasonic electromagnetic field response in infrasonic electromagnetic wave receivers;
d). applying an electromagnetic sounding signal to the earth strata with sufficient electromagnetic energy for the electromagnetic sounding signal to penetrate the earth strata to the depth of interest;
e). Detecting reflected electromagnetic sounding response from the penetrated earth strata in an electromagnetic sounding receiver;
f). processing the reflected seismic response, the induced infrasonic electromagnetic wave response and the reflected electromagnetic sounding response for;
   determining the presence or absence of hydrocarbon bearing formations in the earth strata; and
   determining the depth and areal extent of such hydrocarbon bearing formations.

The above and other features and advantages of the present invention will become apparent from the detailed description of the preferred embodiments thereof for both onshore and offshore exploration which follow. The present invention is explained with particularity in respect to the drawings and disclosures to follow.

BRIEF DESCRIPTION OF THE DRAWINGS

FIG. 2 is a schematic diagram illustrating a portion of the system of the present invention used in acquiring the induced electrokinetic electromagnetic radiation measured.

FIG. 12 is a three dimensional "bright spot" display corresponding to the data shown in FIG. 11, however, drawn with a perspective view to illustrate the three dimensional effect in two dimensions.

DESCRIPTION OF THE INVENTION

The present invention relates to improved methods and apparatus for detecting subsurface deposits of hydrocarbons employing electrokinetic phenomenon. It is well known that seismic waves, generated by acoustic sources, generate electromagnetic dipoles within subterranean earth formations with which the seismic waves interact. These electromagnetic dipoles generate electromagnetic waves which propagate through the earth and may be detected at the earth's surface. These electromagnetic waves provide information concerning the subterranean formations within which the electromagnetic waves were generated. As with seismic or acoustic (mechanical) wave velocities, the electromagnetic (EM) waves can also suffer attenuation and velocity dispersion due to the electric and magnetic properties of the earth's materials. In some instances, these may be substantial enough to require taking into account in field data interpretation.

Figure 1:
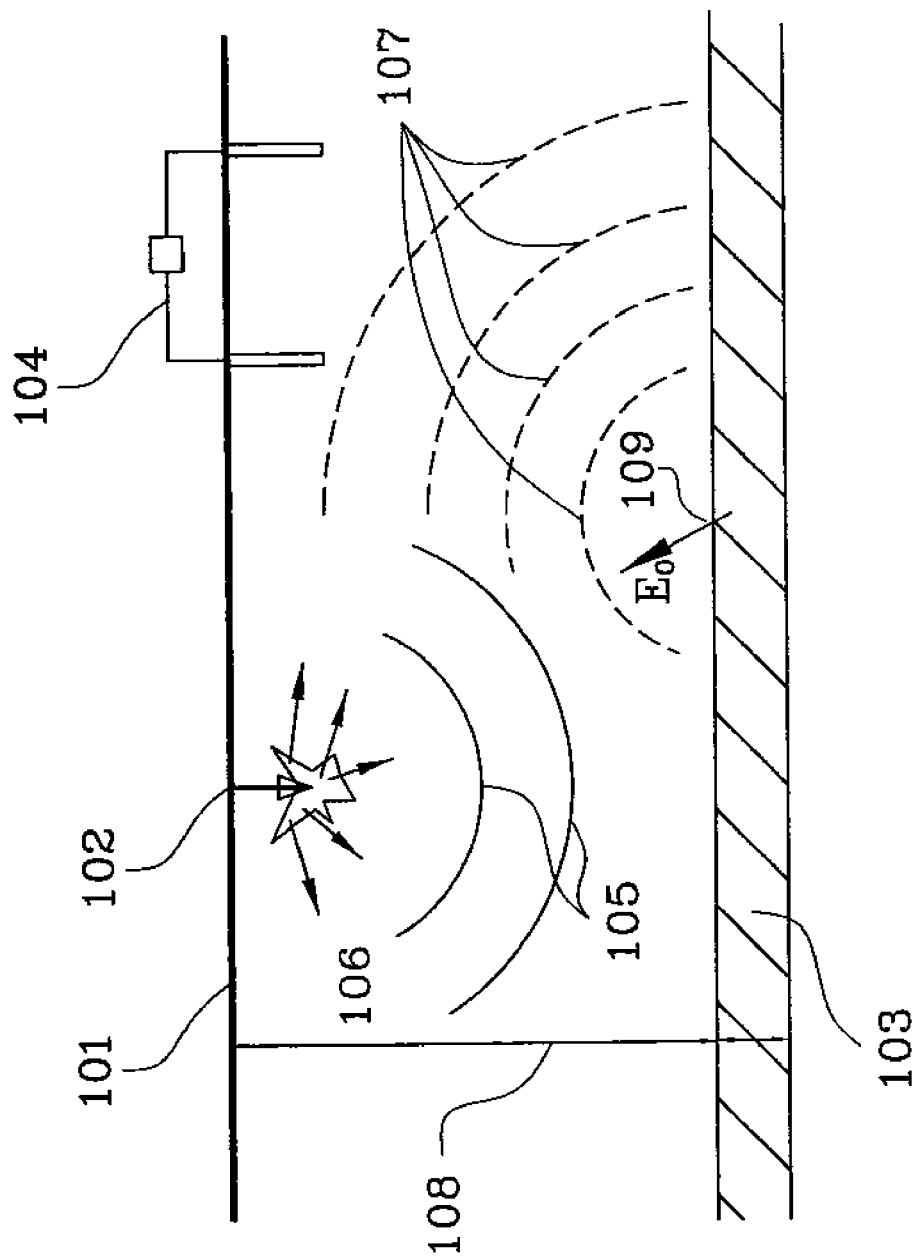
FIG. 1 is a schematic diagram illustrating the principle of the induced electrokinetic electromagnetic radiation from subsurface formations when stimulated by seismic energy impinging thereon.

FIG. 1 of the drawings is a schematic view of a section through the earth from the earth surface 101 to a subterranean earth formation 103 wherein the generation of electromagnetic (EM) waves 107 by the interaction of seismic waves 105 with subterranean earth formation 103, and propagation of the electromagnetic waves 107 to receiver 104 at the earth surface 101 is illustrated.

In FIG. 1, acoustic source 102, located at or near the earth surface 101, provides a seismic impulse to the earth 106 and generates seismic waves 105 which pass through the subterranean strata 106 at the speed of acoustic wave curves (i.e. the speed of mechanical wave propagation). The seismic waves 105 are generated in a spectrum of frequencies, at least from infrasonic, (0.1–20 Hz) through the sonic range up to 1000 Hz. The frequency spectrum and amplitude of the seismic waves 105 generated are determined by the characteristics of the seismic source 102 selected for use. The seismic waves 105 propagate at the speed of sound (sonic propagation velocity) through earth formations which comprise the body of the earth 106. The seismic wave velocity in each formation traversed by seismic waves 105 is determined by the physical characteristics of the formation.

Seismic waves 105 propagating through the earth 106 encounter sub-surface formations, represented by formation 103 in FIG. 1. Upon encountering a sub-surface formation, such as formation 103, seismic waves 105 interact with the solid matrix and fluids present in pore space of the formation 103. Upon interaction of seismic waves 105 with formation 103 an electromagnetic dipole 109 is generated in each pore of formation 103. Electromagnetic dipoles 109 generate electromagnetic waves 107 which propagate through the body of the earth 106 at the speed of electromagnetic (EM) wave propagation which usually is many times faster than sonic wave propagation velocity. The electromagnetic velocity in each formation traversed by electromagnetic waves 107 is determined by the physical characteristics of the formation. An example of the dependence of the electromagnetic velocity on specific restivity of formation is shown in FIG. 2a.

Figure 2A:
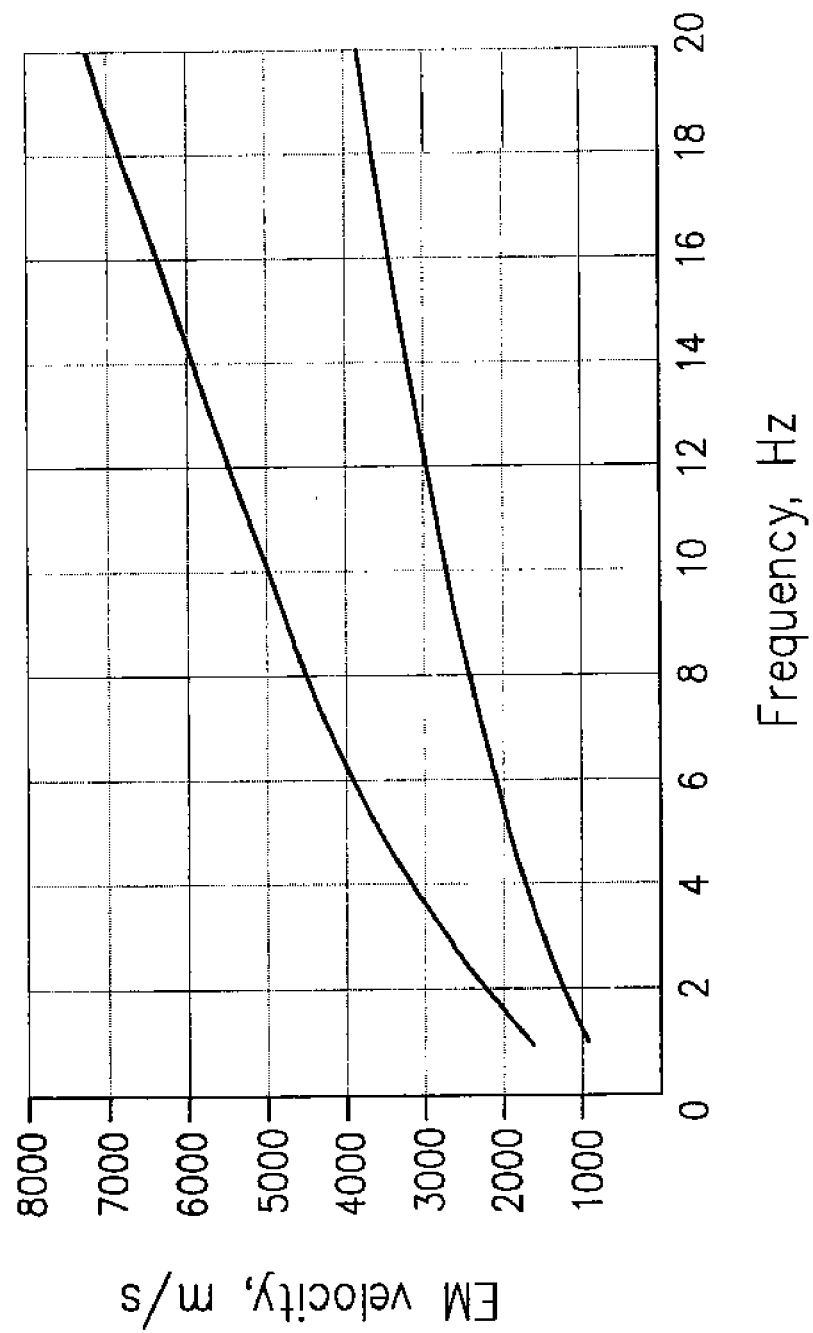
FIG. 2a is a plot illustrating the dependence of electromagnetic wave velocity through earth formations as a function of electromagnetic wave frequency.

Referring now to FIG. 2a, the graphs of dependence of electromagnetic wave velocity on frequency for different geological media is shown. In FIG. 2a, curves 201a and 202a were calculated for media with specific electrical resistivity of 0.3 Ohm*m and 1.0 Ohm*m, respectively. These curves show how low electromagnetic wave velocity can be (less than 1000 m/s). In some cases seismic and electromagnetic waves velocities can have not much difference. It is important in some instances to know both seismic wave velocity and also electromagnetic wave velocity in an investigated area. Therefore the transmitting portion of the acquisition system (FIG. 4) is provided with a dipole electromagnetic antenna to create an electromagnetic wave impulse for electromagnetic soundings of the area.

Electromagnetic waves 107 resulting from induced electrokinetic effect (FIG. 1) have about the same frequency spectrum as seismic waves 105 from which the electromagnetic waves 107 are generated. The electromagnetic waves 107 propagate to the earth surface 101 where they are detected by receiver 104 and where the times of arrival and voltage amplitudes of electromagnetic waves 107 are recorded and processed to yield useful information concerning formation 103, as will be discussed below.

Arrival time of IEK signal after activation of acoustic source 102 can be estimated by the equation:

$$ta = ts + te$$

where: ta is IEK arrival time ts is arrival time of an acoustic wave at formation 103 te is propagation time of an electromagnetic wave from formation 103 to receiver 104.

Obviously if arrival time, seismic and electromagnetic wave velocities are known, the depth 108 to formation 103 is measured.

As stated above electromagnetic waves 107 have the same frequency spectrum as the seismic waves 105, from which electromagnetic waves 107 are generated. Seismic waves 105 are amplitude attenuated as they propagate through earth formations comprising the body of the earth 106, thereby having less amplitude as they penetrate deeper into the earth 106. Consequently, the amplitude of seismic waves 105 which interact with subsurface formations, such as formation 103, become less as the depth 108 to formations 103 increases. Additionally, the higher frequency components of seismic waves 105 are attenuated to a greater extent than lower frequency components of seismic waves 105 as the seismic waves 105 are propagated deeper into the earth 106. Therefore, as seismic waves 105 penetrate to greater depths in the earth 106, the amplitudes of seismic waves 105 are attenuated at an uneven rate according to frequency. That is, the higher frequency components of seismic waves 105 are attenuated more than the lower frequency components of seismic waves 105. The amplitude of seismic waves 105 at any depth determines, in part, the voltage amplitude of electromagnetic (EM) waves 107 generated by interaction of seismic waves 105 with formation 103. Thus, as the depth 108 to formation 103 increases, the voltage amplitude of electromagnetic waves 107 generated, in general, decreases as a result of the attenuation of seismic waves 105.

As shown above, the voltage amplitude of electromagnetic waves 107 are also attenuated as electromagnetic waves 107 propagate through the earth 106. Attenuation of the voltage amplitudes of electromagnetic waves 107 increases with the distance the electromagnetic waves 107 travel through earth 106. Thus, as the depth 108 to formation 103 increases, attenuation of electromagnetic waves 107 reaching receiver 104 increases. Also, the higher frequency components of the electromagnetic waves 107 are more highly attenuated than the lower frequency components as the electromagnetic waves 107 propagate through the earth 106. The EM wave propagation velocity also varies as a function of multiple properties of the rock matrix and fluid content of earth media 106.

As a consequence of the increased attenuation of seismic waves 105 and increased attenuation of the electromagnetic waves 107 as the distance such waves travel through the earth 106 increases, the depth 108 of a formation 103 from which meaningful information may be recovered is limited. That is, the voltage amplitude of the electromagnetic waves 107 reaching receiver 104 must be sufficient to be detected and recorded, and just so with the seismic waves reaching seismic detector.

According to the present invention, I have discovered that by employing a seismic source 102 which produces a substantial proportion of its seismic energy in the form of seismic waves 105 having frequencies in the infrasonic range, (that is, from about 0.1 to about 20 Hz), allows generation of electromagnetic waves 107, having a similar frequency range in hydrocarbon bearing formation 103 at a depth 108 of up to about 5,000 meters or more, which electromagnetic waves 107 have sufficient voltage amplitude to be recorded and processed in receiver 104. The voltage amplitudes of such electromagnetic waves 107 are in part determined by the relatively low frequencies, in the infrasonic range, and the presence of hydrocarbons, particularly oil, in the formation 103.

Seismic waves 105 and electromagnetic waves 107, having frequencies in the infrasonic range, are attenuated less than seismic and electromagnetic waves having higher frequencies. Hydrocarbons, particularly oil, present in formation 103, have a high electrical resistivity and consequently contribute to generation of electromagnetic waves 107 having higher voltage amplitudes than electromagnetic waves generated in formations which do not contain hydrocarbons. In common cases, specific electrical resistivity of natural hydrocarbons is 8–10 orders of magnitude higher than that of contact brines which also occur. The reduced attenuation at infrasonic frequencies of seismic waves 105 leads to generation of higher amplitude electromagnetic waves 107 due to the higher resistivity of hydrocarbons in formation 103. These larger amplitude (at infrasonic frequencies) waves 107 allows detection of the electromagnetic waves 107 generated at greater depth 108 from hydrocarbon bearing rock matrices than from non-hydrocarbon bearing rock matrices.

Figure 5:
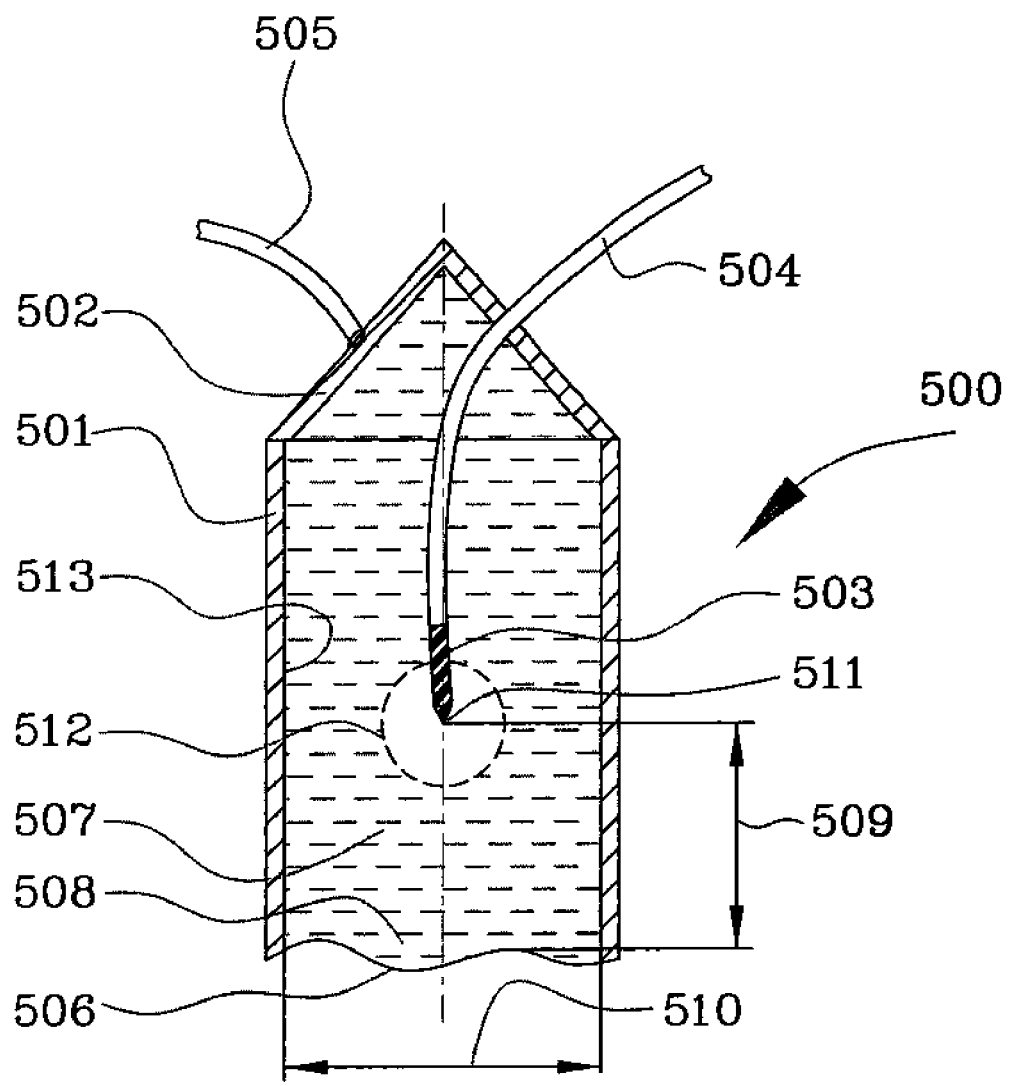
FIG. 5 is a more detailed enlargement of an acoustic source.

A seismic wave generator which produces a substantial portion of its seismic energy in the infrasonic range (about 0.1 to about 20 Hz) is preferably used as sonic source 102. For example, explosives, thumpers, vibrators, and other seismic generators which convert substantial portions of their seismic energy into infrasonic seismic waves may be employed in the present invention. A preferred seismic generator which may be used as seismic source 102 is shown in FIG. 5 of the drawings, as will be described below.

Referring now to FIG. 2, the concept for acquiring measurements of the data previously described in FIG. 1 from the induced electrokinetic (IEK) effect is shown schematically. The system shown in FIG. 2 is only for the acquisition of the data. However, it does contain information for controlling and for firing the sources corresponding to the seismic source 102 in FIG. 1. For purposes of describing FIG. 2, the source 205 corresponds to the source S in FIG. 1.

In FIG. 2, a cable 201 and sensors may comprise dipole antennae which will be described in more detail subsequently, and are connected to provide inputs to a meter circuit firmware and data formatting system 202 which also will be described in somewhat more detail subsequently.

Generally speaking, the metering and formatting circuitry 202 comprises an analog to digital converting system and computer firmware, hardware and software to provide inputs to a computing system. The computing system comprises computers 203 and 204 which are interconnected to each other as indicated by line 206. The system may be thought of as two separate computing components 203 and 204 which are interconnected by line 206 as previously stated. However, from a practical standpoint a single multi programable general purpose digital computer can serve to provide the function of the separate individual computers 203 and 204. Further, it will be appreciated by those skilled in the art that it is understood that the computing system used in this data acquisition and control may comprise anything from personal computers or PC's, to mainframe high speed digital processing systems.

While in FIG. 2, a connecting line 207 is shown between the formatting and digital conversion meter 202 which connects it to the data processing portion of the system, in practicality the entire acquisition hardware system may comprise a single special purpose dedicated system. Such a system may have, for example, digital, analog and/or a mixed hybrid of each such circuitry type, as desired.

Figure 3:
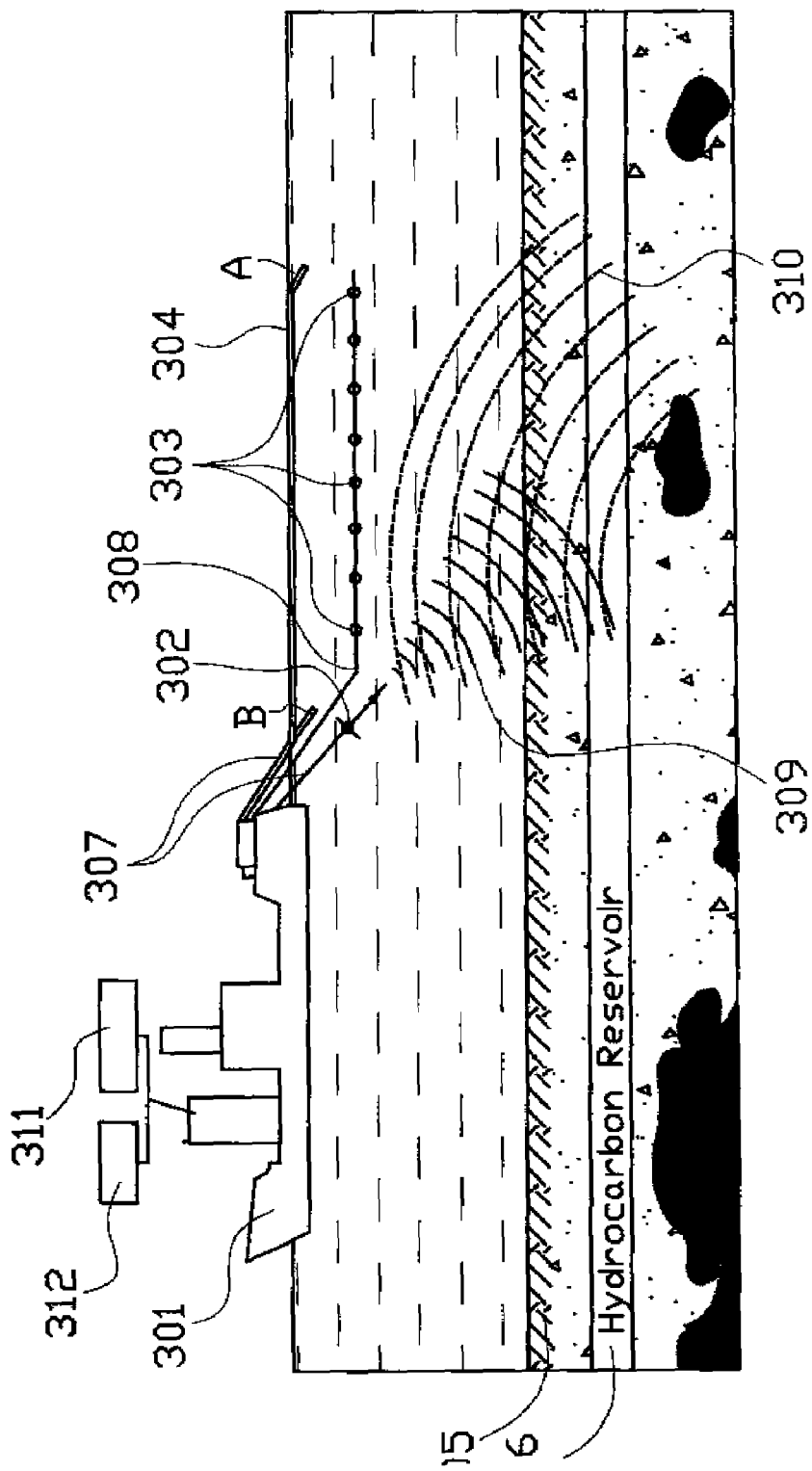
FIG. 3 illustrates an offshore induced electrokinetic and electromagnetic radiation acquisition system towed by a ship at speeds between 0.5 to 7 knots.

FIG. 3 of the drawings is a schematic representation of apparatus and instrumentation in position for obtaining induced Infrasonic Electrokinetic data from subterranian formations below the surface of a body of water such as the ocean or a sea. In FIG. 3, ship 301 is towing an acoustic source 302 and a plurality of IEK and electromagnetic wave receivers and hydrophones 303 through the water at a speed sufficient to maintain the seismic source 302 and receivers/hydrophones 303, in linear alignment. For example, a ship 301 speed of about 4 knots will serve to maintain the array of seismic source 302 and receivers 303 in alignment and provide sufficient headway for an economical survey over an extended distance.

In FIG. 3, seismic source 302 is connected via line 307 to a DC power supply, not shown, on board ship 301. Seismic source 302 is maintained below water surface 304 at a depth below the area of wave action in an attitude such that seismic waves 309 generated upon firing seismic source 302 are directed substantially vertically downward for penetration of the earth surface 305 and subsequent interaction with subterranean formations such as formation 306, for generation of electromagnetic waves 310. IEK receivers 303 are attached in lineal alignment with one another and are electrically connected by line 308 to an acquisition system, not shown, on board ship 301. Electromagnetic waves 310, emanating upward from formation 306, are detected by IEK receivers 303 wherein the voltage amplitudes and time of arrival of the electromagnetic waves 310 are measured. The voltage amplitudes of the electromagnetic waves 310 and their times of arrival are transferred from IEK receivers 303 via line 308 to the acquisition system on board ship 301 for recording and processing. Simultaneously, signals received by hydrophones 303 are transferred via line 308 to the seismic acquisition system. This information will be used to determine seismic velocity in the earth media.

Figure 4:
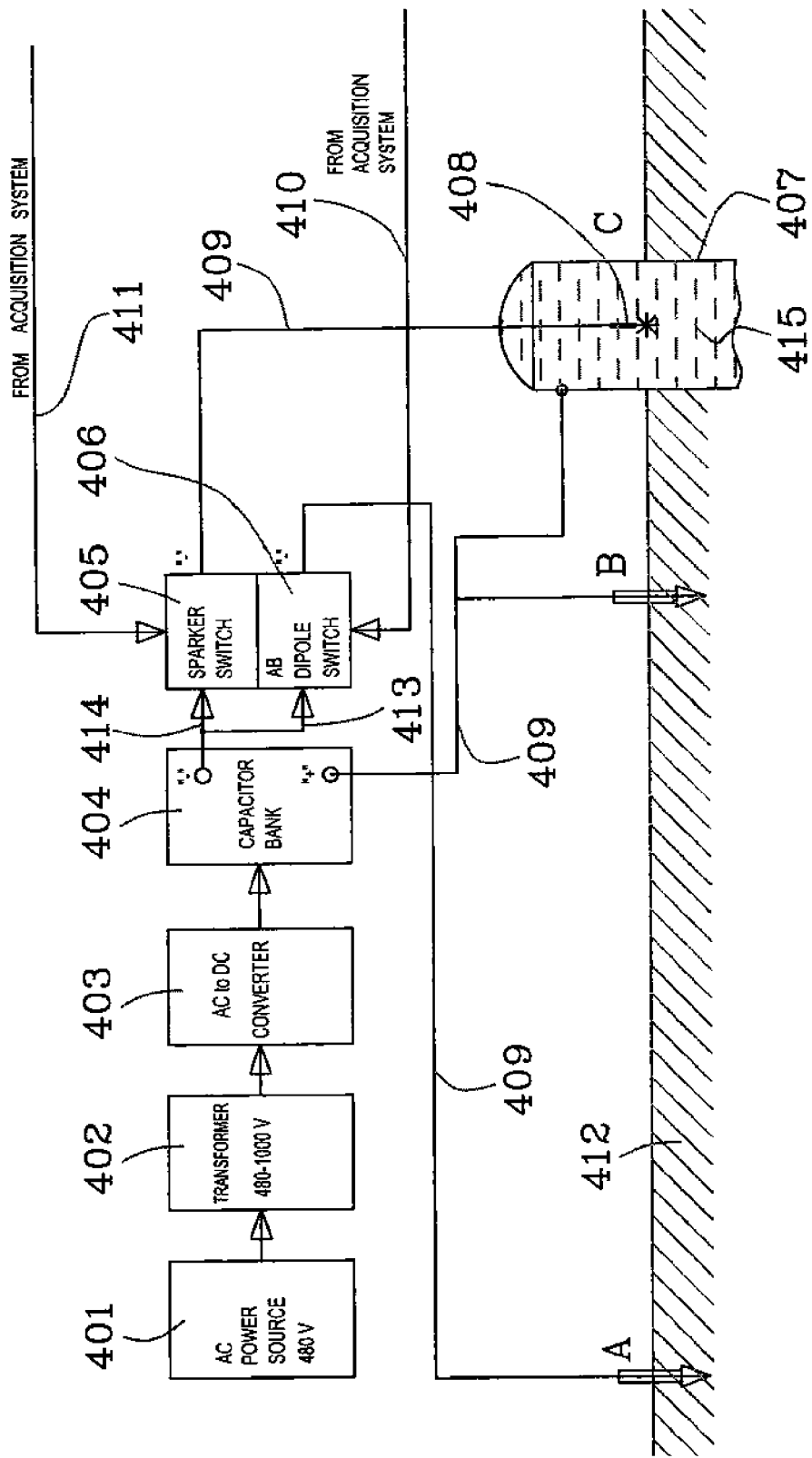
FIG. 4 is a schematic representation of a transmitting portion of the acquisition system of FIG. 3.

Referring now to FIG. 4, the data acquisition and control system previously described in FIG. 2 is shown in somewhat more detail but still schematically. An alternating current power source comprising a 480 volt generator 401 is shown connected to a power transformer 402. Transformer 402 converts the 480 volt output of source 401 to any desired voltage between 480 and 1000 volts to power the system either for onshore or offshore use as desired. An alternating current to direct current converter 403 is supplied with alternating current from transformer 402 and provides operating power to a capacitor bank or rechargeable battery 404 for firing the sparker sources to be described in more detail herein subsequently. A switching system 405 and 406 is shown for supplying switching functions necessary to provide power from the capacitor bank 404 to the sparker 407 via a power cable 409 as shown. It will be observed in FIG. 4 that all power cables 409 are labeled with the same numeral because they are simply electrical connections. Two separate electrical cables or electrical connections 410 and 411 which come from the data acquisition system provide feedback and control functions to and from the computer portion of the system. Alternatively interface hardware to perform this function to the switching portion of the system 405 and 406 is shown schematically in FIG. 4. A single transducer 407 is illustrated in FIG. 4 but it will be appreciated by those skilled in the art that multiple such sparker signal generators may be employed in the system as desired.

It will be observed in FIG. 4 that the positive terminal of a capacitor bank 404 is connected to the outer barrel portion of the sparker 407. The capacitor bank 404 is connected as well as to a terminal labeled B on the surface which provides a positive ground connection at point B of FIG. 4. This provides a current return from the negative electrode 412 of the sparker barrel or sparker gun 407 previously described. A negative return from the capacitor bank 404 is supplied to a portion of the switching system 406 via line 413. This return is also supplied to portion 405 of the switching system via line 414. This places the ground rod located at A at the surface (or in salt water for offshore acquisition) in connection directly to a return ground electrode. This places a negative potential on the outer barrel of the sparker 407. The outer barrel is thus at the same electrical potential, however, with opposite polarity, as the center conductor 412 of the sparker gun 407 illustrated in FIG. 4. This rather unusual feature of the system, which goes away from conventional sparker gun electrical polarity, as shown in U.S. Pat. Nos. 5,205,287 and 4,764,906, has proven to be very useful in the acquisition of data when using the system of the present invention. It has been found that it provides an advantage over systems having conventional polarity from experimental results obtained in both laboratory and field application.

Referring again to FIG. 4, the AC power source 401 comprises a 3 to 60 kilowatt 480 volt source as 401 together with transformer 402 which is connected to an AC to DC converter 403. A large capacitor bank 404 is charged up with the polarity indicated. In operation a signal from the acquisition system via either line 410 or 411 is used to appropriately switch the source on to fire, or to turn on the sensors and formatting hardware in order to provide an electromagnetic field measurement or IEK and a seismic measurement (if desired). A data stream is provided on lines 410 and 411 which are used for both firing and timing the firing of both the sparker devices or for receiving return signals sensed from the earth's surface. Preferably, the distance between points C and B of FIG. 4 is about 10 meters or less. In the "close in" limit, the outside surface of the sparker gun 407 barrel itself can serve the role of electrode B.

In general, the distances between A, B and C will be chosen for an individual survey for geophysical data. These distances will depend on the depth and size of hydrocarbon accumulation suspected to be present. They will also be affected by the depth of the ocean (in offshore exploration), and the physical properties of the subterranean earth media (such as conductivity and resistivity). High conductivity tends to attenuate electromagnetic return signals. These distances, of course, will be customized on any individual survey made with the system of the present invention.

FIG. 5 is a schematic section view of a sparker gun 500 which, in operation, oproduces high energy acoustic waves having a substantial portion of acoustic wave energy in the infrasonic frequency range. A sparker gun designed to the specifications of sparker gun 500 has been found to produce acoustic waves having about 50% of wave energy in the infrasonic range of about 0.1 to about 20 Hz.

In FIG. 5, sparker gun 500 comprises a cylindrical barrel member 501, having a closed top 502, an inner wall 513 and an open bottom 508, and a plasma injector electrode 503. Plasma injector electrode 503 is axially positioned within the interior of barrel 501 at a distance 509 equivalent to at least about 3 times the internal diameter 510 of barrel 501. Barrel 501 internal diameter 510 is equivalent to about 3 times the diameter of a plasma sock 512 (shown in dotted outline) generated upon firing sparker gun 500, as described below.

Barrel 501 is comprised of electrically conductive material, such as steel or copper, and is of sufficient strength to maintain it's shape in use. Electrode 503 is electrically conductive and preferably comprises copper. Plasma injector-electrode 503 is connected via an electrical supply line 504 to the negative pole of a DC electric power source, not shown. Barrel 501 is electrically connected via line 505 to the positive pole of the DC electric power source or to electrical ground, not shown. Electrical supply line 504 is electrically insulated down to its connection with electrode 503.

The dimensions of sparker gun 500 are determined by the electrical energy to be discharged in operation. For example, for the discharge of electrical energy of approximately 1000 amps at a voltage from about 600–2500 volts, barrel 501 may have a diameter 510 in the range of about 7 inches to 25 inches. Electrode 503 is of a diameter sufficient to carry the electric current without overheating when sparker gun 500 is fired. For the electrical load above, (600–2500 volts; 1000 amps), a copper electrode 503 may have a diameter in the range of about 0.2–1.0 inches. Preferably, electrode 503 forms a sharpened tip 511, such that electrical energy will discharge from electrode tip 511 at a high energy density.

In operation, sparker gun 500 is aligned such that barrel bottom 508 is oriented toward a earth strata which is of interest for study according to the method of the present invention. The interior of barrel 501 is filled with an electrically conductive fluid 507, such as salt water or brine. When employed in an offshore situation within a body of water, as will be hereinafter be described, bottom 508 of barrel 501 may be open such that barrel 501 is filled with incident water from the body of water. When employed in an onshore operation, as will be hereinafter described, barrel open bottom 508 may be sealed with a resilient member 506, and barrel 501 filled with an electrically conductive fluid 507, such as salt water or brine. Resilient member 506 will have sufficient strength to contain the electrically conductive fluid 507 within barrel 501 without substantial leakage, but not be so rigid as to unduly attenuate the acoustic waves generated upon firing of sparker gun 500. Resilient member 506 may conveniently comprise a resilient rubber or plastic membrane attached to the open bottom 508 of barrel 501.

In operation, sparker gun 500, with barrel 501 filled with electrically conductive fluid 507 and having bottom 508 directed toward the subsurface formations of interest, is discharged by passing a DC electric current from a power source, not shown, through line 504, to electrode 503. From electrode 503, electric current is discharged from electrode point 511 through the electrically conductive fluid 507 to the inner wall 513 of barrel 501. From barrel 501 the electric current flows via line 505 to the positive pole of the electrical power source or to an electrical ground, not shown In an offshore situation, barrel 501, in contact with the incident body of water, ay serve as electrical ground. Discharge of electrical energy from electrode point 511 into conductive fluid 507 generates a volume of plasma and vapor, the plasma sock 512, in conductive fluid 507. The generation of plasma sock 512 creates a mechanical energy impulse which is discharged from the interior of barrel 501 through barrel bottom 508, generating acoustic waves which pass into a body of water, (for offshore operations), or into the earth, (for onshore operations), with which sparker gun 500 is in contact. Sparker gun 500, as shown and described herein above, advantageously generates acoustic waves having about 50% or more of their energy concentrated in acoustic waves having a frequency in the infrasonic range of about 0.1–20 Hz.

Figure 6:
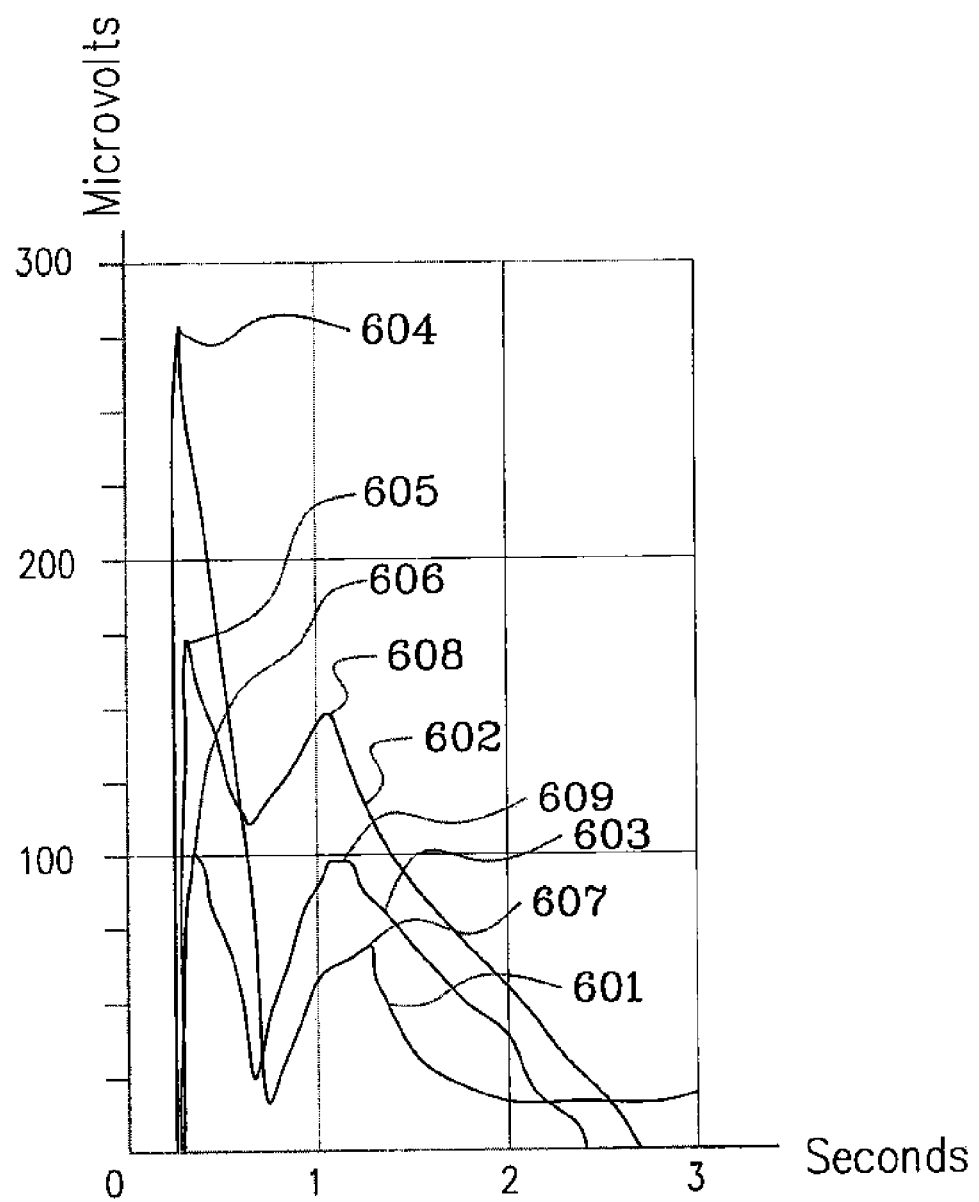
FIG. 6 is a schematic representation of induced electrokinetic and electromagnetic radiation received over a productive reservoir in an actual field experiment and showing hydrocarbon indications.

FIG. 6 is a graphical representation of voltage amplitudes versus time for electromagnetic (EM) waves detected by three receivers similar to receivers 303 in FIG. 3 during a field trial. In FIG. 6, the vertical axis is voltage, measured in microvolts, and the horizontal axis is time in seconds. Curve 601 is a plot of voltages received by a first receiver, curve 602 is a plot of voltages received by a second receiver and curve 603 is a plot of voltages received by a third receiver. The first, second and third receivers were linearly aligned in a traverse across the offshore Golitzino Field in the Black Sea. The voltages recorded are the voltage amplitudes of electromagnetic waves arriving at each of the three receivers. The electromagnetic waves were induced in subterranean formations by interaction therewith of seismic waves generated by a seismic source similar to sparker gun 500 of FIG. 5. About 50% of the energy of the seismic source was converted into seismic waves having an infrasonic frequency in the range of about 0.1 to 20 Hz. Consequently, a major portion of the electromagnetic waves generated have a frequency in the infrasonic range, since the frequency spectrum of IEK electromagnetic waves is at generally the same frequency spectrum as the mechanical or sonic waves inducing the electromagnetic field.

In FIG. 6, time 0 corresponds to the time at which a seismic source such as sparker gun, 500 of FIG. 5, was fired. Seismic waves generated by the seismic source pass downward through the water and earth strata at the velocity of sound in the water and earth media traversed. Upon the seismic waves contacting a subterranean formation, such as formation 306 of FIG. 3, electromagnetic waves are induced which propagate at the speed of EM wave propagation through the earth and water to the receivers. The time of arrival and voltage amplitude of the electromagnetic waves detected by the receivers are recorded in FIG. 6.

A time delay of less than about 0.5 seconds after firing the seismic source was imposed before the recording of the voltage amplitudes received was initiated. At a time of about 0.5 seconds, the detected voltage amplitudes from the three receivers reach peaks 604, 605 and 606. These voltage amplitude peaks 604, 605 and 606 correspond to a known hydrocarbon bearing formation at a depth of about 500 meters in the Golitzino field. Further, at a time of about 1.4 seconds, the voltage amplitudes detected by the three receivers reach peaks 607, 608 and 609 which correspond to a known hydrocarbon bearing formation at a depth of about 2200 meters in the Golitzino field. The voltage amplitude peaks of electromagnetic waves received from the known hydrocarbon bearing formations, compared to the lower voltage amplitudes of electromagnetic waves received from non-hydrocarbon bearing formations, demonstrate the utility of the methods and apparatus of the present invention for detecting the presence of hydrocarbon bearing formations.

In addition to detecting the presence of hydrocarbon bearing formations, application of the method of the present invention provides information which allows determination of the depths to the hydrocarbon bearing formations and of the relative amounts of hydrocarbon in the formations.

As to depth of the formation, seismic waves generated by the seismic source are propagated through the overlying water and the intervening earth formations at sonic velocities and the induced electromagnetic waves are propagated back at the speed of EM wave propagation. Depth determination, however, is not a straight forward calculation because the speed at which the seismic waves and electromagnetic waves traverse the water and each intervening formation may vary. Also, the seismic and electromagnetic waves may be refracted in some of the formations traversed. Thus the speed of sound and degree of refraction of seismic waves must be determined for each formation through which the seismic waves pass, and a "migrated" path and velocity of seismic waves from the seismic source to the formation of interest must be determined. This determination of the time migrated path and velocity of seismic waves is a well known and widely practiced art in the field of seismic exploration of subterranean formations and will not be further described herein. Upon determination of the migrated path and sonic velocities of the seismic waves, the depth to a formation of interest may be calculated, provided the EM wave propagation velocity can be determined. Electromagnetic sounding waves can be used to determine the EM propagation velocity.

An indication of the amount of hydrocarbon in a formation may be obtained from the voltage amplitude of the induced IEK electromagnetic waves received from the formation. The greater the voltage amplitude of induced electromagnetic waves received from a formation of interest compared to the voltage amplitudes of electromagnetic waves received from other formations at similar depths and distances from the receivers, then, the greater the amount of hydrocarbon present in the formation of interest.

FIGS. 7 through 12 are schematic illustrations, in various forms, of data which were actually acquired using a system according to the concepts of the present invention in the field. The plots depicted in these figures are based on the common data which was useful in interpreting the results of previously drilled wells into areas previously suspected to contain known structures bearing hydrocarbon (or thought to be so) beneath the earth's surface. The structural maps depicted in FIGS. 7 through 12 contain multiple wells, some of which resulted in hydrocarbon production and some of which turned out to be dry holes. These initial wells were drilled and completed at depths indicated by purely seismic data prospecting over the area. The data presentation in FIGS. 7 through 12 which combines the seismic measurements with measurements made by the system of the present invention, for measuring induced electrokinetic IEK energy, show in several cases why some wells were successfully completed and produced hydrocarbon, while at least one other well investigated produced only a dry hole. Altogether, FIGS. 7 through 12 indicate that techniques according to the concepts of the present invention give results which are consistently explainable in terms of previous "seismic only" surveys. Also they show that the present invention may be used to correct or enhance previously made seismic surveys.

Pure seismic data is reliant on a knowledge or assumption concerning the acoustic wave propagation rate in the rock media beneath the earths surface. This is necessarily so since the speed of acoustic wave propagation is so slow that it may take several seconds for a single energy impulse of acoustic energy to travel to deeper rock layers and return to the surface. In contrast to this, the return of the Induced Electrokinetic Effect (IEK) electromagnetic EM wave field occurs generally faster. This is essentially the same in all subsurface media. It will be noted, of course, that attenuation of the amplitude of electomagnetic energy in subsurface media varies more than does attenuation of acoustic energy through the same media. In some instances, particularly in cases where the subsurface formation media are more electrically conductive than insulative, such media tend to rapidly attenuate electromagnetic wave propagation.

In spite of these variations, however, the propagation of the electromagnetic EM wave energy through earth formations for geophysical prospecting may be assumed to be a determinable function of time from the time it is generated and transmitted until the time it is received and impinges upon the surface or near surface receivers. A distance versus time plot of IEK return signals can require some "move out" or wave migration processing corrections. Such corrections are known to be necessary with seismic waves in order to correct for velocity dispersion and to migrate the seismic waves to true depth. Similarily, the technique of the present invention includes those for correcting the EM wave field to true depth.

Figure 7:
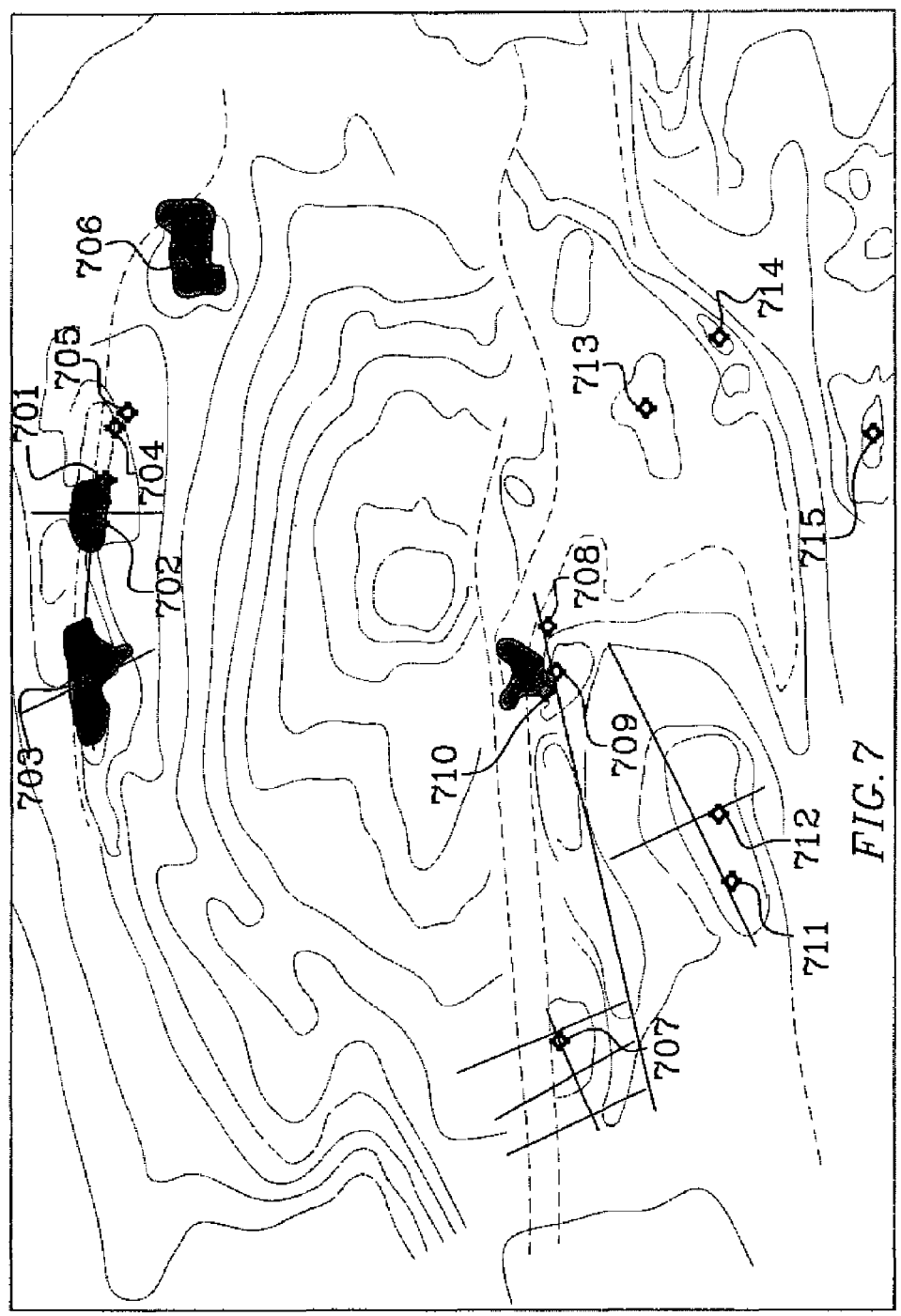
FIG. 7 is a graphical representation of electromagnetic radiation data obtained from induced electrokinetic effects generated over a known gas condensate accumulation employing an acquisition system as shown in FIG. 3 in the same geographical area as for FIG. 6.

In FIG. 7 four wells which are the same wells and which will be referred to with respect to other Figures are numbered 701, 702, 703 and 704. These four wells roughly lie along the same straight line in the structure being prospected using the techniques of the present invention. Also in FIG. 7, the horizontal and vertical axes both represent spatial distances while the Z axis (into the paper) represents depth to structure. Equal contour depths based on the seismic data and well drilling data from this structure are given on the contour lines in the figure. They range from approximately 1000 feet to approximately 9000 feet below the surface of the earth as may clearly be seen from FIG. 7.

Figure 8:
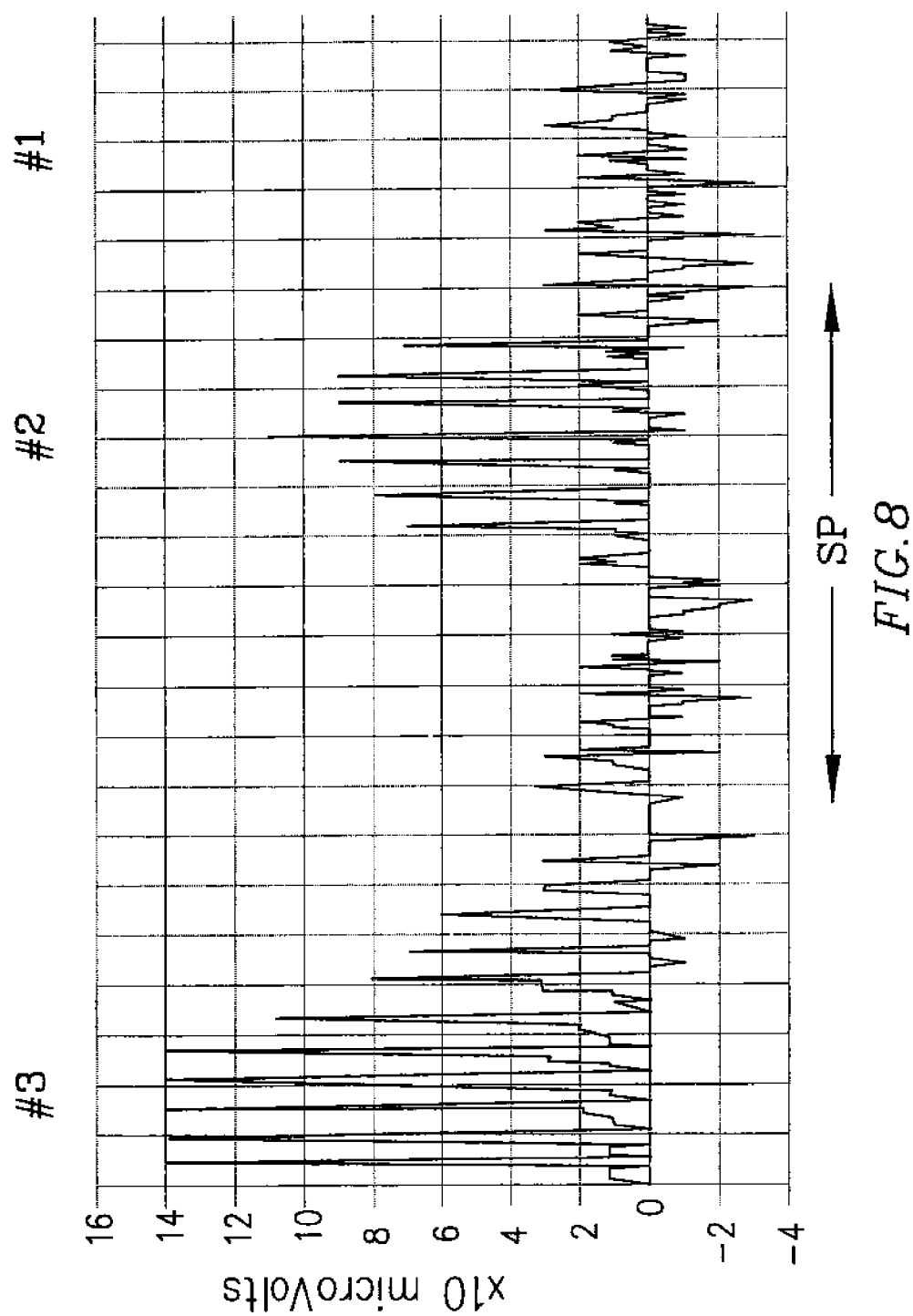
FIG. 8 is a graphical representation of electromagnetic radiation data obtained from induced electrokinetic effects over a dry structure in the same geographical area as for the previous figures.

Referring now to FIG. 8, a survey according to concepts of the present invention is shown. This survey is taken over a line connecting wells 1, 2, 3 and 4. The graphical display of the Induced Electrokinetic effect field over two hydrocarbon accumulations are shown. Well number 1 is a proven dry hole and is also shown. In the graphical representation shown in FIG. 8 the vertical axis represents the received IEK signal multiplied by 10 in units of microvolts.

The first striking feature observed in FIG. 8 is that the IEK signal taken over well number 1, the dry hole, averaged over time essentially is zero. That is to say, there are about as many negative going peaks as positive going peaks in the portion of the survey line over well number 1. This is a clear indication that there is essentially a return for an IEK signal in well number 1 indicative of no hydrocarbon interface present beneath the surface of the earth as indicated by the IEK signal.

It will also be observed, however, that large positive going peaks over the same geographical area are indicated for well number 2 and well number 4 which are known producing wells having successful hydrocarbon production therefrom. The contrast shown in FIG. 8 between returns from the dry well and two producing wells clearly indicates the advantages of the IEK techniques of the invention as direct hydrocarbon indicators, whose credibility is better than purely seismic data. The seismic data are interpreted in terms of assumptions made in migrating the seismic data based on models having no a priori knowledge of down hole acoustic travel times since they were taken prior to the drilling of any of these wells. The EM wave data utilize these and other techniques of the present invention to find and correct the EM velocity data together with the seismic data and provides enhancement thereto.

Figure 9:
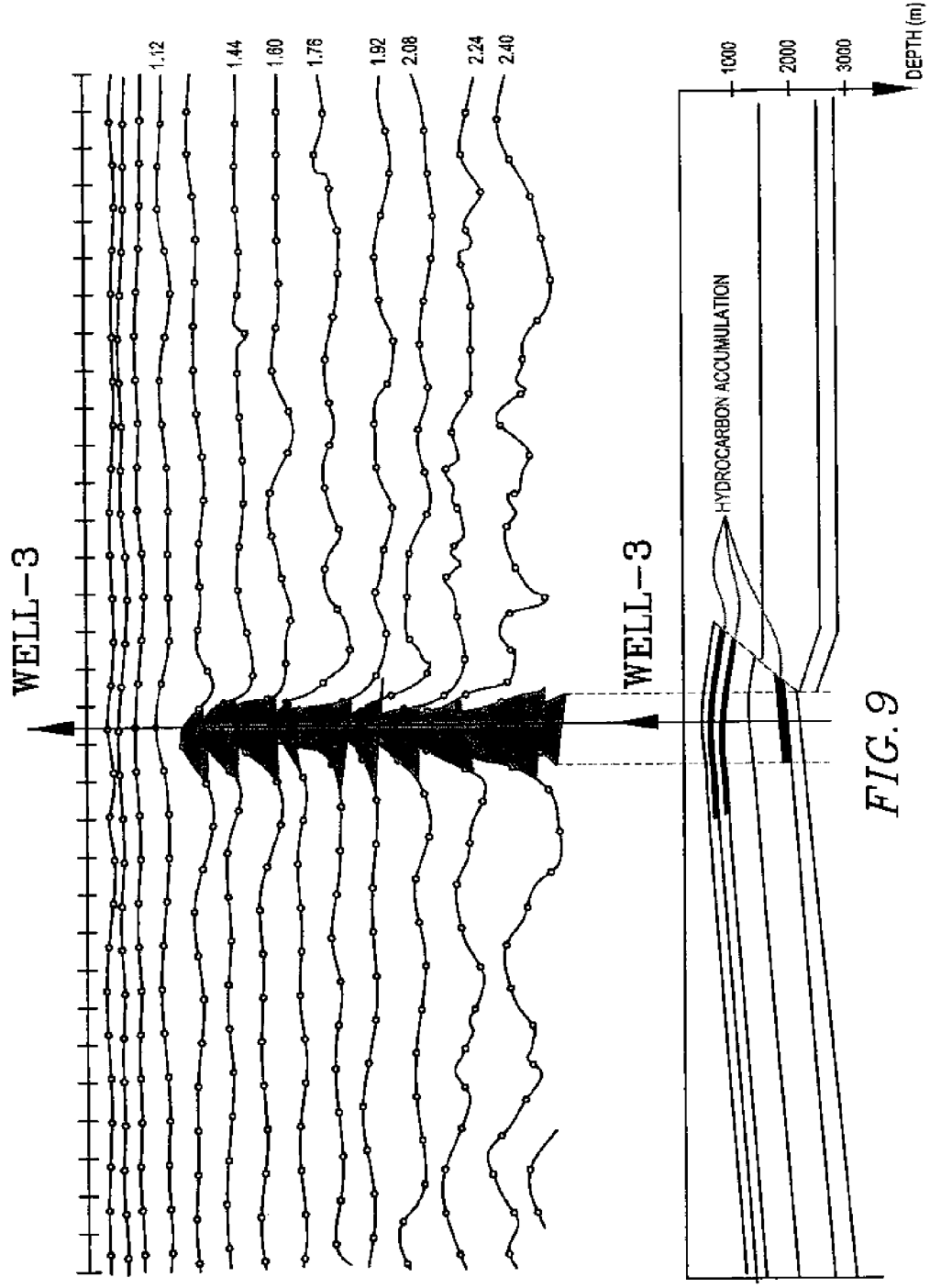
FIG. 9 shows schematically an induced electrokinetic effect electromagnetic radiation field over a known gas condensate accumulation and refers to the same geographical area.

Referring now to FIG. 9 an IEK measurement sequence taken over well number 3 of FIG. 7 is illustrated schematically. In the top portion of FIG. 9 the horizontal axis is a distance coordinate with well 3 located at the center thereof. In the top portion of FIG. 9 the IEK measurement axis (in arbitrary units) is given on the right hand side in the upper portion of the figure. The lower portion of the Figure in FIG. 9 illustrates a time migrated structural map of the seismic data based upon corrected seismic returns which are deconvolved by conventional seismic techniques. Two known zones of hydrocarbon productions are labeled 901 and 902 in the bottom portion of FIG. 9 based on the drilling data and the accurately migrated seismic data. The data show hydrocarbon accumulations at well number 3. In FIG. 9 twelve redundant passes over the same line where the IEK measurements were made are indicated on the right by labels "pass #1, #2, and so on to #12". The IEK signals are then stacked (or summed progressively) as the passes are accumulated for the data such that in pass #12, a much stronger return IEK signal is illustrated by an increased amplitude return. The areas over the hydrocarbon accumulations known to exist due to the well data from well logs made in well #3 and from the accurately migrated seismic data in the lower portion of FIG. 9 clearly illustrate the agreement between the accurately migrated seismic data and the IEK redundantly stacked (or summed) data.

The results obtained in this pilot IEK survey have shown as follows:

Marine IEK technology produces real time data with moving vessel;

Clear positive IEK anomalies have been detected over the hydrocarbon fields confirmed by drilling; and Dry prospects confirmed by drilling have no IEK anomalies.

Figure 10:
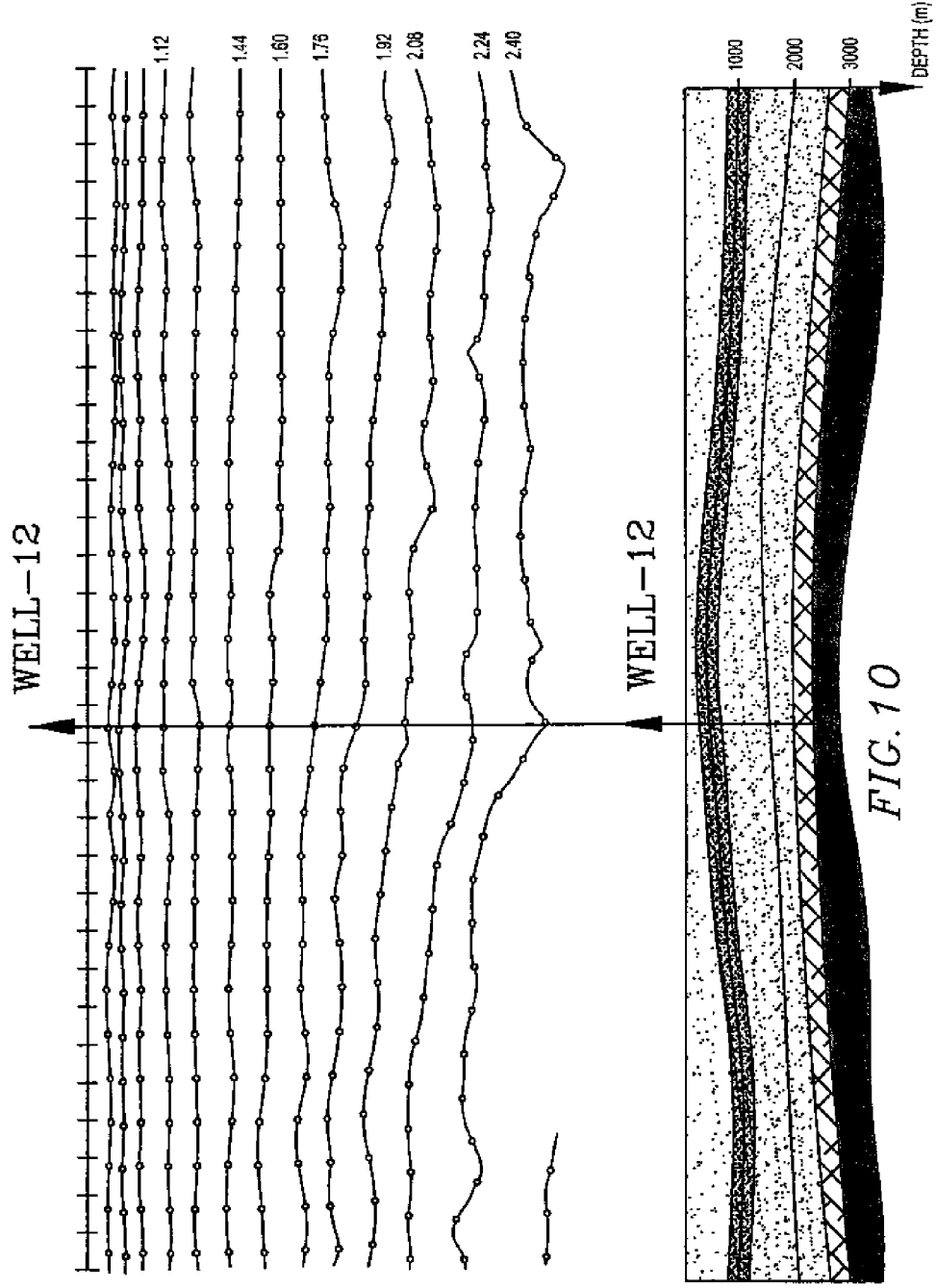
FIG. 10 shows an induced electrokinetic electromagnetic radiation effect measurement field over a dry structure in the same geographical area as the previous figures.

Referring now to FIG. 10, IEK stacked measurements and a correctly time migrated seismic data record which are in exact analogy shown with respect to FIG. 9 are illustrated. However, in this FIG. 10, well #12 of FIG. 7 which was a dry structure (when proved when drilled) shows an accurate agreement with the properly migrated signals in seismic and the stacked IEK return signals. No anomalous IEK signals were recorded because the structure was dry. It is therefore apparent that the IEK processed data and the correctly time migrated seismic data are in perfect agreement over this dry structure.

Figure 11:
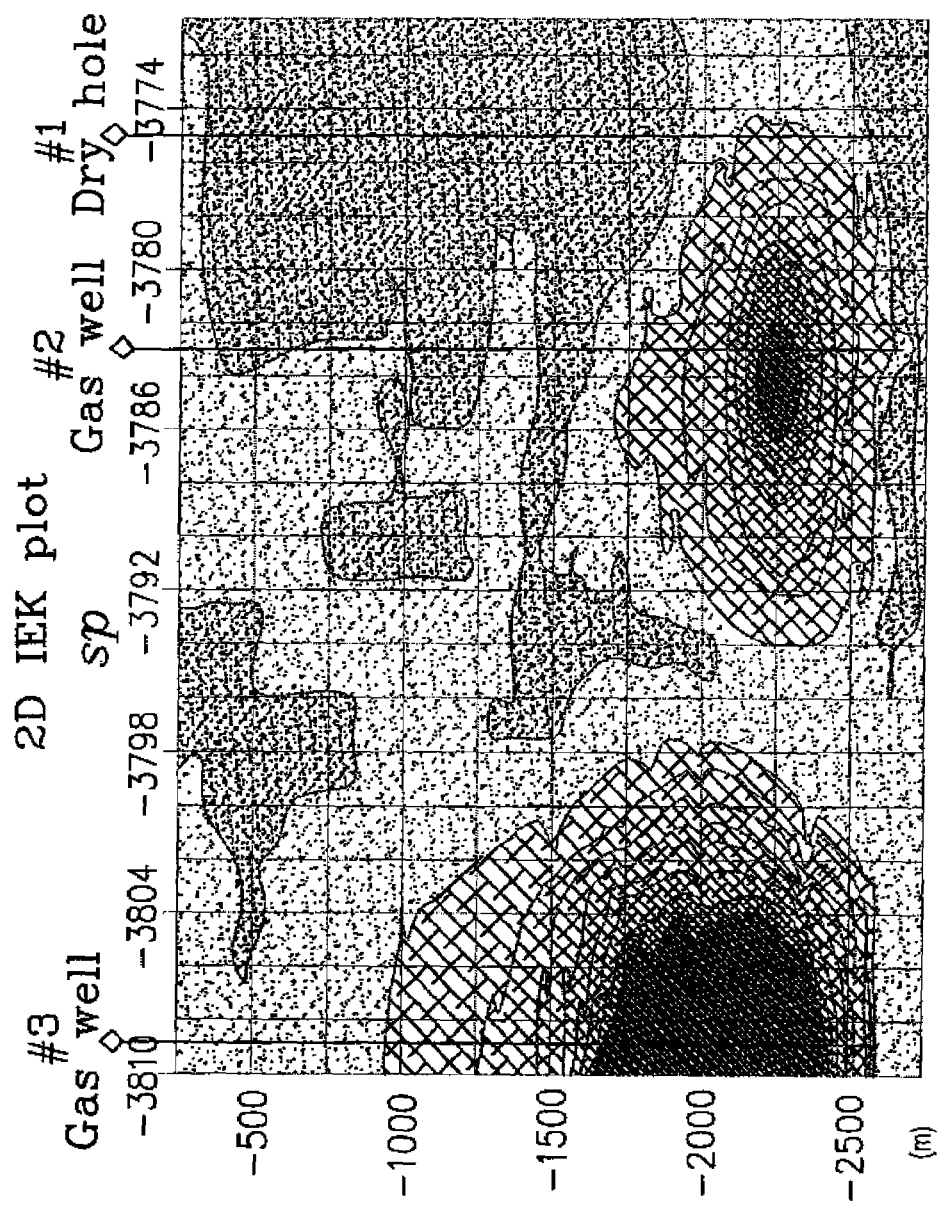
FIG. 11 is a seismic "bright spot" presentation format of data corresponding to that of FIG. 10.

Referring now to FIG. 11, a two dimensional "bright spot" (as known in the seismic industry) displays is shown. The geographical area is the same as that of wells 1, 2, and 4 previously discussed with respect to FIG. 7. Depth in meters shown on the vertical axis coming out of the paper. The horizontal axis shows distance in meters from an arbitrary starting point along the line of the survey from FIG. 11. Contour areas of contrast indicated by the IEK field are shown as so called bright spots indicating the presence of hydrocarbon accumulations in FIGS. 11 and 12. An intensity scale of the IEK field is shown at the extreme right edge of the graphical representation of FIG. 11 in microvolts over the range from −1 to 15. It will be noted in FIG. 11 that wells #1, 2, and 4 were exploration wells of which well #1 as previously discussed with respect to the prior Figures turned out to be a dry hole. Wells #2 and 4 turned out to be productive hydrocarbon producers. Therefore, wells 2 and 4 show as bright spots in the IEK field bright spot display of FIG. 11.

Referring now to FIG. 12, a three dimensional bright spot display corresponding to the two dimensional display in FIG. 11 is illustrated schematically. Once again in FIG. 12 three spatial axes are illustrated in the same manner but are drawn with a perspective. These spatial axes are used in displaying the spatial dimensions in a conventional seismic bright spot display process with migrated or time domain seismic data. Once again, in FIG. 12 the IEK field intensity scale is shown as a bar graph vertically oriented along the right hand edge of the Figure and illustrating by intensity shade grey scale different IEK return signal field strengths. It is apparent that in FIG. 12 as in FIG. 11 the consistency of the IEK measurement with seismic data when correctly migrated is extremely strong.

It may be stated, from the above descriptions of FIGS. 7 through 12, that IEK and seismic measurements when presented properly and interpreted properly by trained seismologists or geophysicists can be interpreted with much more precision than can either of the measurements taken alone. This feature of the present invention further distinguishes it as a true invention and advancement of the state of the art of geophysical prospecting.

The effect of EM wave velocity dispersion in earth formations near the surface is addressed in an experimental paper by A. H. Thompson and G. A. Gist at page 1169 of the December, 1993 issue of "The Leading Edge". This experimental paper, however, only deals with relatively near surface phenomenon down to a depth in the earth of 20 meters or so.

A more recent experimental and theoretical paper by J. Garambois and M. Dietrich, published Jun. 11, 2001 in "Geophysics Online" and in "Geophysics", VOL. 66, NO. 5, pp 1417–1430 (September–October, 2001) delves into this thorny subject in more depth. This paper suggests the use of separate transducers sensitive to the electric and to the magnetic components of the induced EM waves, when coupled with theoretically derived filter functions to suppress noise, etc., can result in acquisition of useful data from greater depth under the earth's surface. The paper suggests, however, that the near surface material electrical and magnetic properties may tend to mask or hide valid IEK electromagnetic signals generated at greater depth if not properly accounted for. The technology of the present invention, however, belies such fears and complications as agreement and enhancement of IEK EM wave data as well as seismic data are consistent with each other as given previously in the examples shown in FIGS. 8–12.

Another more recent article appearing in "First Break" Vol. 20, pp 142–143. Mar. 3, 2002 discusses how an EM wave "sounding" technique can be combined with seismic data taken over the same geographical area to provide an indication of whether liquids imaged by the seismic data are hydrocarbon or water. In this paper the authors (T. Eialesmo and S. Ellingswal) used an EM wave source located on the sea floor to import EM waves at low frequencies into the earth's layers below the sea floor. A horizontal electric dipole source and an array of electric field receivers are used to emit an EM wave signal in the frequency range from a few tenths of one hertz to a few tens of hertz into the underlying earth layers. The signal is rapidly attenuated in the conductive sediments, but in a resistive layer (hydrocarbon bearing) the propagation of the EM wave is more efficient and the layer can act as a "duct" or wave guide for propagation along the layer. Energy from the ducted EM wave leaks back upward toward the seafloor deployed electric field receivers where it is detected. When the source to receiver offset (ie distance) is comparable to, or greater than, the depth to the ducting layer, energy leaking from the layer will dominate over the energy reflected back to the surface from shallower or deeper EM wave reflectors such as brine or salt water bearing layers.

U.S. Pat. No. 6,717,411B2 issued Apr. 6, 2004 and is directed to the technique in the "First Break" article discussed immediately above. It is noted, however, that this technique is viewed by the inventors as a stand alone EM wave exploration method and system which does not contemplate, or even discuss, the IEK signals generated by contemporaneous use of seismic energy to excite such IEK signals. Instead the patented technique is viewed as a tool to discover and monitor reservoir fluid movement over a period of time or to locate and determine the depth of the ducting layers in the earth. Such a use for an EM wave sounding system is also disclosed in another research article appearing in "First Break" Vol. 20, pp 224–225, Apr. 4, 2002 by A. Ziolkowski, B. Hobbs, and D. Wright This article describes experimental data acquired over an underground gas storage reservoir in France. Again, however, the use of seismic induced IEK signals is not discussed or even contemplated in the paper.

The methods and systems of the present invention are directed to using a combination of electrokinetic (IEK), electromagnetic (EM wave) and seismic data to get a much more reliable appraisal of evaluation of a geographic area being investigated than has heretofore been possible. The present invention enables location and depth to a hydrocarbon bearing earth strata to be determined along with an estimate of the nature of the fluids contained therein.

In practicing the invention techniques offshore the seismic source and detectors of seismic returns, the EM wave transmitter and receiver and the IEK response sensing detectors may all be deployed along a streamer cable towed by a conventional exploration vessel. Using the seismic source an infrasonic burst of seismic energy is applied via the seismic source and a seismic reflection response from the seismic detectors (hydrophones) is detected. An EM wave source such as a low frequency generator and capacitor bank is used to generate a powerful EM wave burst of energy in the 0.1 hertz to 50 hertz frequency range which propagates downwardly and is reflected and refracted back toward the EM wave detectors in the streamer array. The EM wave response (or sounding) is used to determine EM wave propagation velocity by timing and recording the return EM wave signals. The range of power used, the length of the EM wave antenna on the streamer and any orientation angle of polarization which can be detected are determined by the geological conditions of the area being explored. The IEK signal induced in the subsurface interface from deep hydrocarbonaceous strata is also detected and recorded. These data may then be processed together using the concepts of the present invention to determine the presence or absence of a hydrocarbon containing reservoir, an areal outlining of the reservoir and an appraisal of its depth. In this processing the firing rate of the seismic source, the firing time of the EM wave source and other parameters are treated as independent variables which can be adjusted in real time during the survey based on data quality being gathered. Thus a feedback adjustment is available for optimizing the survey as it is being made.

I claim:

1. An acoustic source for infrasonic electromagnetic wave exploration comprising:
    an electrically conductive, generally cylindrical tubular member for containing an electrically conductive fluid, said tubular member having a closed top end, an open bottom end, an interior wall and an internal diameter;
    an electrode axially positioned within the tubular member, wherein said electrode is axially positioned within the tubular member at a distance equivalent to about three times the internal diameter of the tubular member to enable the acoustic source to produce high energy acoustic waves having a substantial portion of acoustic wave energy in the infrasonic frequency range;
    means for electrically connecting the electrode to the negative electrical pole of an external source of DC electric power; and
    means for electrically connecting the tubular member to one of:
        a positive electrical pole of the external source of DC electric power;
        an electrical ground; and
        a combination of the above.

2. The acoustic source of claim 1, wherein said tubular member has an internal diameter equivalent to about 3 times the diameter of a plasma sock created in the conductive fluid upon discharge of DC electrical power from the electrode through the conductive fluid, to the inner wall of the tubular member.

3. The acoustic source of claim 2, wherein the electrode has a sharpened tip for increasing the electrical energy density at the electrode tip upon discharge of DC electrical power from the electrode, through the conductive fluid to tubular member internal wall.

4. The acoustic source of claim 2, wherein the conductive fluid selected from the group consisting of salt water and brine containing at least about 3 grams per liter of dissolved inorganic salts.

5. The acoustic source of claim 4, wherein the conductive fluid comprises salt water from a body of water in which the acoustic source is positioned.

6. The acoustic source of claim 5, wherein the tubular member is in contact with the body of water comprising said means for connecting the tubular member to the electrical ground.

7. The acoustic source of claim 2, wherein said means for connecting the electrode to the negative electrical pole of the external source of DC electric power comprises:
    an opening in the upper portion of the tubular member; and
    an insulated electrical conductor passing through the opening in the upper portion of the tubular member and having a first end for electrical connection to the electrode and a second end for electrical connection to the negative pole of the external DC electrical power source.

8. The acoustic source of claim 2, further comprising a resilient cover for closing the tubular member bottom opening and retaining the conductive fluid within the tubular member without substantially attenuating acoustic waves generated upon the discharge of electric power from the electrode, through the conductive fluid to tubular member inner wall.

9. The acoustic source of claim 1, wherein the high energy acoustic waves having a substantial portion of acoustic wave energy in the infrasonic frequency range include
    acoustic waves having approximately 50% of wave energy in the infrasonic range of about 0.1 to 20 Hz.

10. An acoustic source for oil exploration comprising:
    a substantially cylindrical member having an internal diameter and including:
        a closed top end,
        a bottom end, and
        an inner wall;
    an electrically conductive electrode axially positioned within said substantially cylindrical member at a distance equivalent to about three times the internal diameter of said substantially cylindrical member, wherein the positioning of said electrically conductive electrode produces high energy acoustic waves having a substantial portion of acoustic wave energy in the infrasonic frequency range;
    a first connector to connect said electrically conductive electrode to a negative electrical pole of an external source of DC electric power; and
    a second connector to electrically connect the substantially cylindrical member to a positive electrical pole of the external source of DC electric power, an electrical ground, or a combination of the positive electrical pole of the electrical ground.

* * * * *